Aug. 14, 1923.
J. BERLIEN
1,464,635
STEERING WHEEL FOR AUTOMOBILES AND THE LIKE
Filed March 19, 1921   2 Sheets-Sheet 2
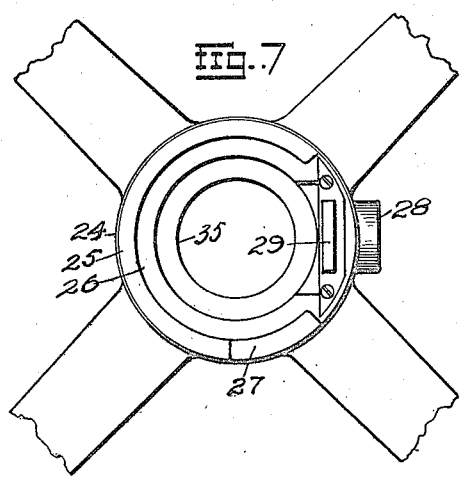
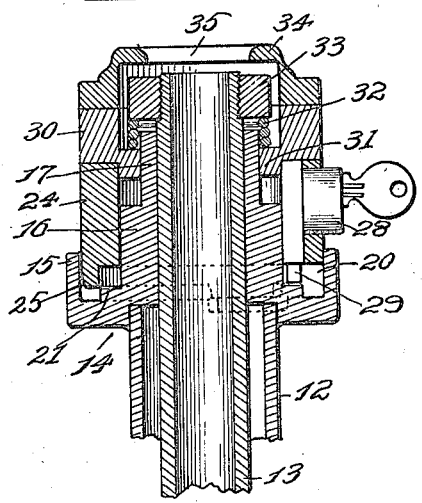
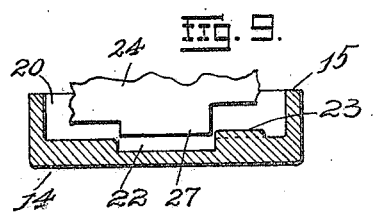
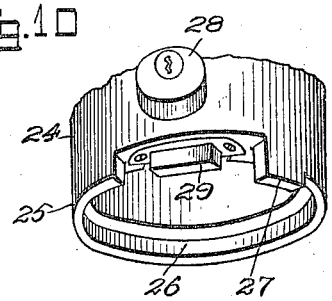
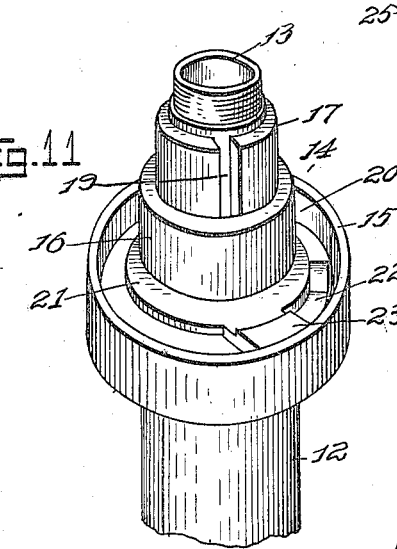
Inventor
John Berlien Patented Aug. 14, 1923.

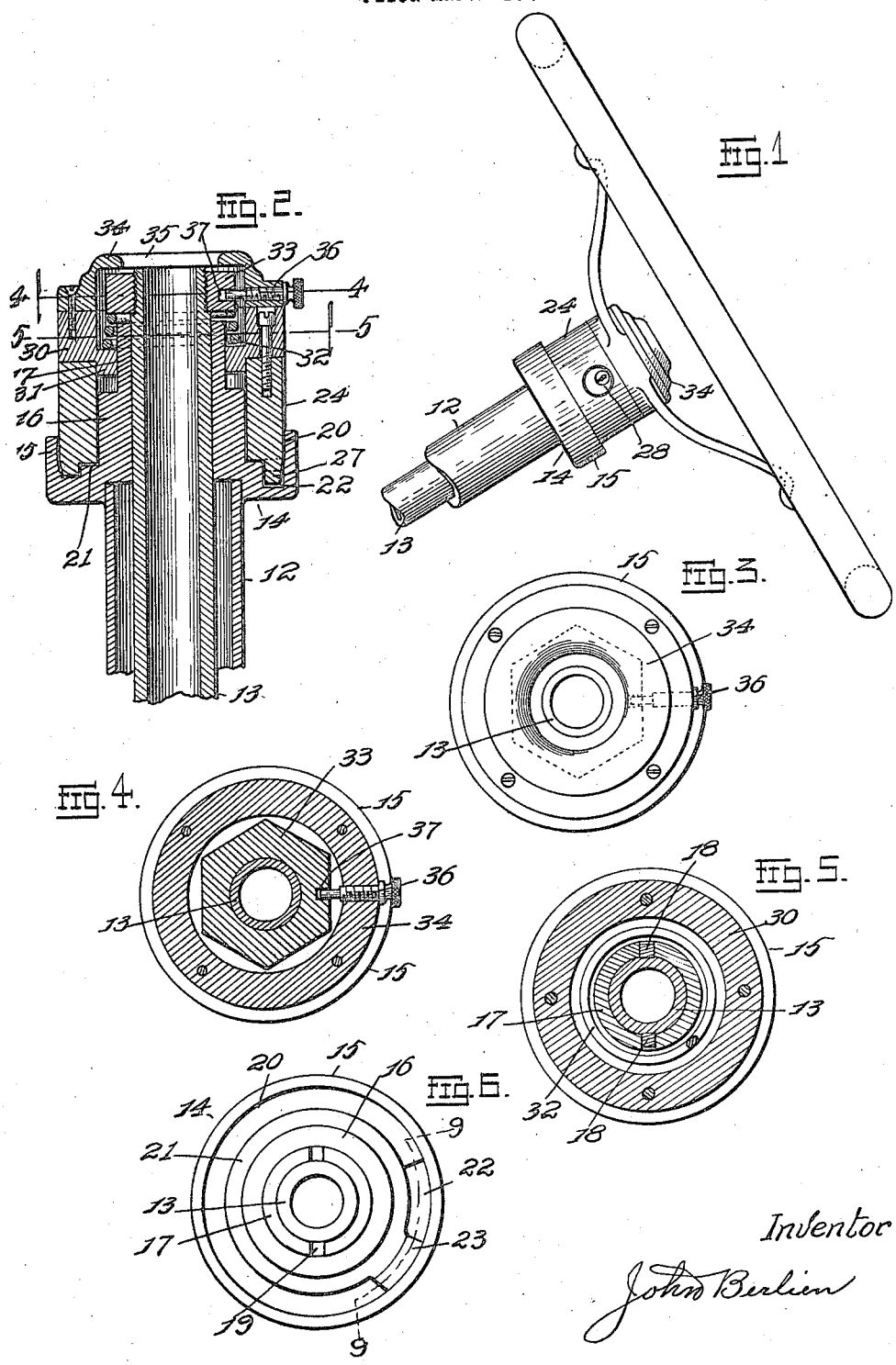

1,464,635

UNITED STATES PATENT OFFICE.

JOHN BERLIEN, OF ST. LOUIS, MISSOURI.

STEERING WHEEL FOR AUTOMOBILES AND THE LIKE.

Application filed March 19, 1921. Serial No. 453,604.

*To all whom it may concern:*

Be it known that I, JOHN BERLIEN, a citizen of the United States, and resident of St. Louis, Missouri, have invented certain new and useful Improvements in Steering Wheels for Automobiles and the like, of which the following is a specification.

This invention relates to improvements in a steering wheel for automobiles and the like, and has for its object a wheel loosely mounted on the steering post and a mechanism for locking the same thereon, when it becomes necessary to control the steering mechanism of the machine.

A further object is to provide the wheel with a spring which normally holds the parts in operative steering condition, and by slightly pulling upon the wheel will release the parts, and a lock for holding the parts in un-engaged relation.

A further object is to permit the wheel when in un-engaged relation to partially operate the steering mechanism to such degree as to come within the rules and ordinances, governing the parking of a machine, thus permitting the machine to be sufficiently guided in the event of emergencies to remove the car from its parking position in the event of fires or similar circumstances.

Figure 1, is a side view of my invention.

Fig. 2, is a central sectional view of the operative mechanism which embodies my invention.

Fig. 3, is a top plan view of the same.

Fig. 4, is a cross-sectional view taken on the line 4—4 of Fig. 2.

Fig. 5, is a cross sectional view taken on the line 5—5 of Fig. 2.

Fig. 6, is a top plan view of the column cup made use of.

Fig. 7, is a bottom plan view of the wheel hub.

Fig. 8, is a vertical sectional view of the mechanism taken through the lock.

Fig. 9, is a fragmental sectional view of the cup taken on the line 9—9 of Fig. 6.

Fig. 10, is a detail perspective view of the hub section and lock.

Fig. 11, is a detail perspective view of the column cup.

The invention consists in constructing a mechanism which is applied to the steering column 12 of an automobile, and a portion to the steering post 13.

The mechanism which embodies my invention consists in loosely mounted on the upper end of the column 12 a cup 14 comprising a flange 15, a center body portion 16 and a cylindrical integral sleeve 17, the same being bored out to receive the steering post 13 and to which it is firmly held by keys 18 or the like, which are seated in key-ways 19 formed in the sleeve and body portion 16, and functioned by frictional contact driving fit, or forming a shallow slot in the upper end of the post 13.

Between the flange 15 and body portion 16 is formed a channel 20 in which is a shoulder 21, the same running around the base of the entire body portion 16.

A portion of the bottom of the channel 20 is deepened forming a depression or cavity 22 and adjacent to said cavity is a projection 23, the purpose of which will be hereinafter described.

Over the body portion 16 is movably mounted a sleeve or rim 24, its bottom 25 provided with a cut out portion 26, so shaped as to correspond with the bottom of the channel 20. On the surface of the bottom 25 is a projection 27 which is designed to fit or seat itself in the cavity 22 when the parts are in proper relation for steering condition, and when the lock 28 carried by the rim 24 is manipulated pulling the latch 29 in and removing it from the shoulder 21.

On the top of the rim 24 is mounted a ring 30, the same having an inwardly and downwardly extension 31 which fits between the rim 24 and sleeve 17 and on which rests a coil spring 32, the tension of which is to press the rim 24 into the channel 20 of the cup.

On the top end of the post 13 is applied a nut 33, on the under side of which contacts the top of the coil spring 32, and the tension of the spring is regulated by the adjustment of said nut.

On the top of the ring 30 is fixed a cap or cover 34, which may be either closed or provided with an opening 35, this depending largely upon the conditions of the construction and position of the spark and throttle levers passing through the post.

In order to provide a positive and firm grip between the wheel section and cup 14, and to prevent the spring from being compressed by accidently pulling upward on the wheel I provide a fastening device which is in the form of a screw 36 seated in the cap or cover 34 the inner end adapted to enter into a depression 37 formed in the surface of the nut 33. This device may be in the form of a spring actuated pin for quick action if so required.

By this mechanism it prevents the wheel from becoming disengaged from its operative position if in the event the driver should suddenly and by excitement when in close quarters exert a pulling pressure on the wheel.

The operation of my invention is as follows:

When the appliance is in position and it is desired to place the wheel in a loose inoperative position so that the steering gear cannot be effectively operated, the screw 36 is first released from the nut 33, the wheel is then pulled upon which compresses the spring 32 and brings up the rim 24 releasing the projection 27 from the cavity 22.

The lock is then operated throwing out the latch 29, letting it ride upon the surface of the shoulder 21.

When so positioned it will permit the wheel and its parts to freely turn in the cup 14, the projection 27 however striking the projection 23 on either side depending upon the direction of the wheel movement thereby permitting the wheel to freely rotate a little less than one revolution. Where the steering gear is engaged it may be operated in that particular direction only, but will prevent a positive and steady guiding of the running gear. This complies with the ordinance, compelling a steering mechanism to be so functioned as to allow a parked machine to be sufficiently guided when emergency compels the car to be moved in the event of fire or the like.

This partial operation will, however, not be sufficient to permit the steering gear to control the steady guiding of a machine during travel.

To rigidly connect the wheel, the lock is manipulated pulling in the latch 29, and by the expansion of the spring the rim is pressed into the channel and the projection 27 in the cavity 22.

Having fully described my invention what I claim, is:

1. A steering wheel for automobiles and the like, comprising a cup member rigidly connected to the upper end of a steering post and loosely mounted on the column, said cup member having a channel formed therein, a sleeve forming a part of the steering wheel operating in the cup member, a projection formed on the bottom of the sleeve and adapted to seat itself in a depression formed in the bottom of the channel, and a lock which when operated preventing the projection from seating itself in said depression, substantially as specified.

2. A steering wheel of the character described comprising a cup member, said cup member fixed firmly to a steering post, a sleeve located around the cup member, the upper portion of said sleeve having a hollowed out portion, a nut attached to the top of the steering post, a spring located between the nut and sleeve, a projection formed on the bottom surface of the sleeve, the cup member loosely mounted on the top of the steering column but firmly connected to the steering post, said cup member having a channel portion in which is a cavity more deeply depressed than the remaining portion of the channel and is to receive the projection on the bottom of the sleeve, and a lock for controlling the position of the sleeve with the cup, substantially as specified.

3. A steering wheel comprising a cup member attached to the top of a steering post, said cup member loosely mounted on the top of the steering column which encases the steering post, a sleeve, a channel formed in the cup member for the reception of the lower end of the sleeve, a projection formed on the bottom edge of the sleeve and adapted to fit into a depression formed in the channel of the cup, a projection formed in the channel and adjacent the depression and acting as a stop to limit the turning motion of the sleeve, a lock carried by the sleeve for controlling the position of the sleeve projection with the depression in the cup, and a spring located in the sleeve for normally holding the sleeve in close contact with the cup, substantially as specified.

4. A steering wheel comprising a sleeve, a cup member, each positioned to operate one within the other, a channel formed in the cup member the same having a depression formed therein, a projection formed on the bottom edge of the sleeve and adapted to be seated in the depression, a nut located on the upper end of the steering rod to which the cup member is fixed, said cup member rigidly connected to the steering post, a spring located between the nut and cup member, a retaining device in communication with the nut, and a locking mechanism carried by the sleeve for locking and unlocking the sleeve to the cup member, substantially as specified.

5. A steering wheel comprising a cup and a hub in communicative position, a steering post on which said cup is rigidly connected, a means whereby the wheel may be partially operated when the same is locked, a spring mechanism for normally holding the hub in close communication with the cup, a locking mechanism carried by the hub, a retaining device for controlling the action of the spring, and a projection for controlling the turning action of the wheel, substantially as specified.

In testimony whereof, I have signed my name to this specification, in presence of two subscribing witnesses.

JOHN BERLIEN.

Witnesses:
ALFRED A. EICKS,
B. M. MANNE.